(12) United States Patent
Park et al.

(10) Patent No.: US 8,499,793 B2
(45) Date of Patent: Aug. 6, 2013

(54) VALVE UNIT AND REACTION APPARATUS HAVING THE SAME

(75) Inventors: Jong-myeon Park, Yongin-si (KR);
Yoon-kyuong Cho, Yongin-si (KR);
Jeong-gun Lee, Yongin-si (KR);
Beom-seok Lee, Yongin-si (KR);
Sung-woo Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 12/979,049

(22) Filed: Dec. 27, 2010

(65) Prior Publication Data

US 2011/0126918 A1 Jun. 2, 2011

Related U.S. Application Data

(63) Continuation of application No. 11/766,806, filed on Jun. 22, 2007, now Pat. No. 7,926,514, and a continuation of application No. 11/625,009, filed on Jan. 19, 2007, now Pat. No. 7,998,433.

(30) Foreign Application Priority Data

| Apr. 4, 2006 | (KR) | 10-2006-0030496 |
| Aug. 4, 2006 | (KR) | 10-2006-0073814 |
| Sep. 25, 2006 | (KR) | 10-2006-0092924 |
| Sep. 25, 2006 | (KR) | 10-2006-0092925 |

(51) Int. Cl.
*F15C 1/04* (2006.01)

(52) U.S. Cl.
USPC .......................................... 137/828; 251/11

(58) Field of Classification Search
USPC ...................... 137/831, 828, 827, 825; 251/11
See application file for complete search history.

(56) References Cited

U.S. PATENT DOCUMENTS

| 5,039,559 | A | 8/1991 | Sang et al. |
| 5,961,492 | A | 10/1999 | Kriesel et al. |
| 6,063,589 | A | 5/2000 | Kellogg et al. |
| 6,302,134 | B1 | 10/2001 | Kellogg et al. |
| 6,321,721 | B1 | 11/2001 | Okumura et al. |
| 6,337,215 | B1 | 1/2002 | Wilson |

(Continued)

FOREIGN PATENT DOCUMENTS

| JP | 61-205793 A | 9/1986 |
| JP | 2002-215241 A | 7/2002 |

(Continued)

OTHER PUBLICATIONS

Chinese Patent Office, Communication dated Mar. 7, 2011 from the State Intellectual Property Office of P.R. China in a counterpart application No. 200710084926.3.

(Continued)

*Primary Examiner* — Craig Schneider
(74) *Attorney, Agent, or Firm* — Sughrue Mion, PLLC

(57) ABSTRACT

Provided are a valve unit and a reaction apparatus having the valve unit. The valve unit includes a phase transition material, which melts and expands upon an application of the electromagnetic waves to the valve filler, and the valve filler is directed into the channel through the connection passage and closes the channel. The valve unit also includes heat generation particles, which are dispersed in the phase transition material and generate heat upon an application of electromagnetic wave energy.

17 Claims, 14 Drawing Sheets

U.S. PATENT DOCUMENTS

| | | | |
|---|---|---|---|
| 6,375,901 | B1 | 4/2002 | Robotti et al. |
| 6,565,526 | B2 | 5/2003 | Seward |
| 6,575,188 | B2 | 6/2003 | Parunak |
| 6,679,279 | B1 | 1/2004 | Liu et al. |
| 7,195,036 | B2 | 3/2007 | Burns et al. |
| 7,926,514 | B2 * | 4/2011 | Park et al. .............. 137/828 |
| 2002/0047003 | A1 | 4/2002 | Bedingham et al. |
| 2003/0156991 | A1 | 8/2003 | Halas et al. |
| 2006/0219308 | A1 | 10/2006 | Oh et al. |
| 2007/0092409 | A1 | 4/2007 | Beatty et al. |
| 2008/0187474 | A1 | 8/2008 | Park et al. |

FOREIGN PATENT DOCUMENTS

| | | |
|---|---|---|
| WO | 03/081052 A1 | 10/2003 |
| WO | 2004/074694 A1 | 9/2004 |
| WO | 2004/088148 A1 | 10/2004 |
| WO | 2005/107947 | 11/2005 |
| WO | 2007/050418 A | 5/2007 |

OTHER PUBLICATIONS

Chinese Patent Office (State Intellectual Property Office of P.R. China), Communication dated Apr. 19, 2011, in Application No. 200710092051.1.

Park et al., "Multifunctional Microvalves Control by Optical Illumination on Nanoheaters and its Application in Centrifugal Microfluidic Devices," Lab on a Chip, Royal Soc. Of Chemistry, Cambridge,GB, vol. 7, Feb. 15, 2007, pp. 557-564.

K. Tashiro, "A Particles and Biomolecules Sorting Micro flow System Using Thermal Gelation of Methyl Cellulose Solution," 2001, whole document.

Oh et al., "A Phase Change Microvalve Using a Meltable Magnetic Material: Ferro-Wax," Bio Lab, Samsung Advanced Institute of Technology, Oct. 9-13, 2005, pp. 554-556.

Liu et al., "Self-Contained, Fully Integrated Biochip for Sample Preparation, Polymerase Chain Reaction Amplification, and DNA Microarray Detection," Analytical Chemistry, vol. 76, No. 7, Apr. 1, 2004 pp. 1824-1831.

* cited by examiner

VALVE UNIT AND REACTION APPARATUS HAVING THE SAME

CROSS-REFERENCE TO RELATED PATENT APPLICATION

This application is a continuation of U.S. patent application Ser. Nos. 11/766,806 and 11/625,009, filed on Jun. 22, 2007 and Jan. 19, 2007, respectively, and application Ser. No. 11/766,806 claims the benefit of Korean Patent Application Nos. 10-2006-0073814 and 10-2006-0092925, filed on Aug. 4, 2006 and Sep. 25, 2006, respectively, and application Ser. No. 11/625,009 claims the benefit of Korean Application Nos. 10-2006-0030496 and 10-2006-0092924, filed Apr. 4, 2006 and Sep. 25, 2006, respectively, in the Korean Intellectual Property Office, the disclosures of which are incorporated herein in their entireties by reference.

BACKGROUND OF THE INVENTION

1. Field of the Invention

The present invention relates to a valve unit that can close a channel in a timely manner so as to block fluid flow and can open a channel at a predetermined time so that a fluid can flow along the channel, and an apparatus having the same.

2. Description of the Related Art

Generally, a substrate (i.e., a chip) used for a biochemical reaction such as a lysis reaction or a polymerase chain reaction (PCR) is provided with a micro-channel constituting a flow path. In order to prevent the fluid from being vaporized or flowing during the biochemical reaction, the micro-channel should be closed on time. A micro-valve unit has been proposed to control the flow of fluid in the micro-channel.

One of such micro-valve is shown in FIG. 1. FIG. 1 is a top view of a conventional valve disclosed in U.S. Pat. No. 6,679,279 and Anal. Chem. Vol. 76, pages 1824-1831, 2004.

Referring to FIG. 1, a conventional valve unit 10 includes a channel 12 formed on a substrate 11, an air pump 15 connected to the channel 12, and paraffin wax P provided on a connecting passage 16 between the air pump 15 and the channel 12. In order to heat the air pump 15 and the paraffin wax P, a heating plate 20 is mounted on the substrate 11. The paraffin wax P undergoes solid-liquid-phase transition in response to changes in temperature. In initial stage, the paraffin wax P is in solid and clogs the connecting portion 16. Upon an application of heat generated by the heating plate 20, the paraffin wax P is melted, and the air pump 15 is activated, the melted paraffin wax P' is pumped toward the channel 12 by the air expansion in the air pump 15, as shown by the double dashed line of FIG. 1. The reference number 13 denotes a main reaction chamber 13 where a biochemical reaction occurs.

However, in the conventional valve unit 10, the air pump 15 and the heating plate 20 are provided on the substrate 11, making it difficult to miniaturize and fabricate the substrate 11. In addition, it takes a relatively long time to close the channel by re-solidifying the paraffin wax that is melted by the heat and directed to the channel. Therefore, it is difficult to precisely control the closing timing of the channel 12.

SUMMARY OF THE INVENTION

The present invention provides an improved valve unit that allows the miniaturization of the valve unit in microfluidic system and the integration of a biochemical reaction substrate, and a reaction apparatus having the valve unit.

The present invention also provides a valve unit that can close a channel upon irradiation of electromagnetic waves, such as a laser beam, and a reaction apparatus having the valve unit.

According to an aspect of the present invention, there is provided a valve unit including: a valve filler which includes a phase transition material and a plurality of heat generation particles; a chamber to receive the valve filler; a fluid channel; and a connection passage which is located between the chamber and the fluid channel and provides fluid communication between the chamber and the fluid channel, wherein the heat generation particles are dispersed in the phase transition material and generate heat upon an application of electromagnetic wave energy, and wherein the phase transition material melts and expands upon an application of heat which is generated by the heat generation materials, thereby the valve filler is directed into the channel through the connection passage and closes the channel. The valve unit may further include an external energy source which applies electromagnetic waves to the valve filler.

According to another aspect of the present invention, there is provided a reaction apparatus including: a substrate which provides a reaction chamber and a fluid channel, each fluid communicate with the other; and a valve unit which closes the fluid channel, wherein the valve unit includes: a valve filler which includes a phase transition material and a plurality of heat generation particles; a valve chamber to receive the valve filler; and a connection passage, wherein the connection passage is located between the valve chamber and the fluid channel and provides fluid communication between the valve chamber and the fluid channel, wherein the heat generation particles are dispersed in the phase transition material and generate heat upon an application of electromagnetic wave energy; wherein the phase transition material is in solid phase at an operational temperature of the apparatus, and wherein the phase transition material melts and expands upon an application of heat which is generated by the heat generation materials, thereby the valve filler is directed into the channel through the connection passage and closes the channel.

The valve unit may further include an external energy source which applies electromagnetic waves to the valve filler. The external energy source may comprise a laser beam source irradiating a laser beam.

The laser beam source may include a laser diode.

The laser beam emitted from the laser beam source may be a pulse electromagnetic wave having an energy of at least 1 mJ/pulse.

The laser beam emitted from the laser beam source may be a continuous wave electromagnetic wave having an output of at least 10 mW.

The laser beam emitted from the laser beam source may have a wavelength in the range of 750 to 1300 nm.

The heat generation particles may have an average diameter in the range of 1 nm to 100 µm. The heat generation particles may be dispersed in hydrophobic carrier oil.

The heat generation particles may include a ferromagnetic material or a metal oxide. The metal oxide may be at least one selected from the group consisting of $Al_2O_3$, $TiO_2$, $Ta_2O_3$, $Fe_2O_3$, $Fe_2O_4$, and $HfO_2$.

The heat generation particles may have be in the form of a quantum dot or a magnetic bead. The heat generation particles may be formed of a polymer.

The magnetic bead may include at least one magnetic material selected from the group consisting of Fe, Ni, Cr, and an oxide thereof.

The phase-transition material may be at least one selected from the group consisting of wax, a gel, and a thermoplastic resin.

The wax may be at least one selected from the group consisting of paraffin wax, microcrystalline wax, synthetic wax, and natural wax.

The gel may be formed of at least one material selected from the group consisting of polyacrylamide, polyacrylates, polymethacrylates, and polyvinylamides.

The thermoplastic resin may be at least one selected from the group consisting of cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

The valve unit may further include a buffer chamber in the connection passage.

The reaction apparatus, which includes the valve unit of the present invention, may further include a rotating unit for rotating the substrate, wherein the valve filler to which the electromagnetic wave is irradiated is pumped to the fluid channel by a centrifugal force generated by the rotation of the substrate.

The reaction apparatus may include multiple valve units, each located at inlet port and outlet port sides of the reaction chamber.

The substrate may include upper and lower plates bonded together.

The upper and lower plates may be bonded together by adhesive or are thermally bonded together by an ultrasonic wave. Alternatively, the upper and lower plates may be bonded together by a double-side adhesive layer.

The fluid channel, the reaction chamber, the valve chamber, and the connection passage may be formed on one of the upper and lower plates of the substrate.

The substrate may be provided with a fluid hole, through which a fluid is injected into the fluid channel, and with a valve filler hole, through which the valve filler is injected into the valve chamber.

At least a portion of the substrate may be transparent so that the electromagnetic wave can be transmitted therethrough.

The present invention also provides a valve unit including: a valve filler; a valve chamber filled with the valve filler; a fluid channel; and a connection passage connecting the valve chamber to the fluid channel, wherein, the valve filler includes a phase-transition material which melts and expands its volume upon an application of the electromagnetic waves and flows into the channel through the connection passage to close the channel. The valve unit may further include an external energy source irradiating electromagnetic waves to the valve filler.

The present invention also provides a reaction apparatus including: a substrate which provides a fluid channel and a reaction chamber; and a valve unit which closes the fluid channel, wherein the valve unit includes a valve filler; a valve chamber filled with the valve filler; and a connection passage connecting the valve chamber to the fluid channel, wherein, the valve filler includes a phase-transition material which is in solid phase at an operational temperature of the apparatus, melts and expands its volume upon an application of the electromagnetic waves, and flows into the channel through the connection passage to close the channel. The valve unit of the reaction apparatus may further include an external energy source irradiating electromagnetic waves to the valve filler.

According to another aspect of the present invention, there is provided a valve unit including: a substrate; a channel formed in the substrate defining a path through which a fluid flows; a plug formed in the channel to block the path of the fluid in the channel when the plug is in a solid state at a room temperature, the plug including a phase change material and a plurality of heat-dissipating particles dispersed in the phase change material; and an external energy source which irradiates the plug with electromagnetic energy, wherein, when the plug is irradiated with the electromagnetic energy, the plurality of fine heat-dissipating particles dissipate heat and the phase change material become molten opening the path to allow the fluid to flow.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

While the present invention has been particularly shown and described with reference to exemplary embodiments thereof, it will be understood by those of ordinary skill in the art that various changes in form and details may be made therein without departing from the spirit and scope of the present invention as defined by the following claims.

Figure 1:
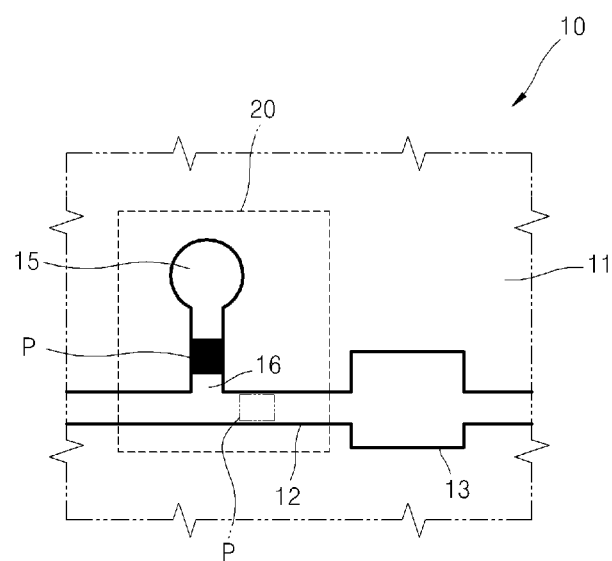
FIG. 1 is a top view of a conventional valve.
Figure 2A:
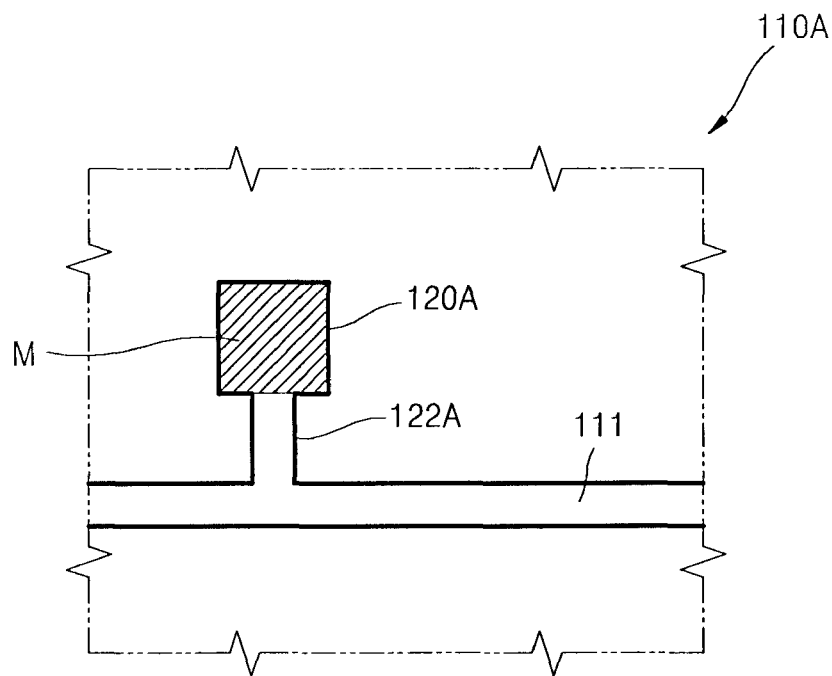
FIG. 2A and FIG. 2B are top views of a valve unit according to one exemplary embodiment of the present invention.
Figure 2B:
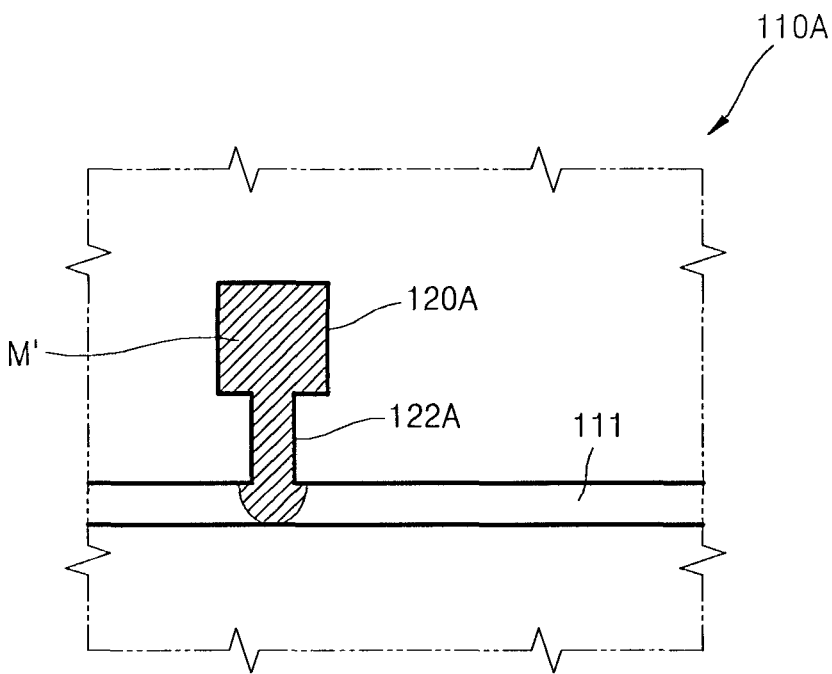

FIGS. 2A and 2B are top views of a valve unit according to one exemplary embodiment of the present invention.

Referring to FIGS. 2A and 2B, the valve unit 110A includes a valve filler M which includes a phase transition material and a plurality of heat generation particles; a chamber 120A to receive the valve filler; a fluid channel 111; and a connection passage 122A which is located between the chamber and the fluid channel and provides fluid communication between the chamber and the fluid channel. The phase transition material undergoes changes in its phase depending on the temperature and is expandable upon an application of heat. The heat generation particles are dispersed in the phase transition material and generate heat upon an application of electromagnetic wave energy. The valve unit includes an external energy source (not shown) which applies electromagnetic waves to the valve filler.

Figure 3:
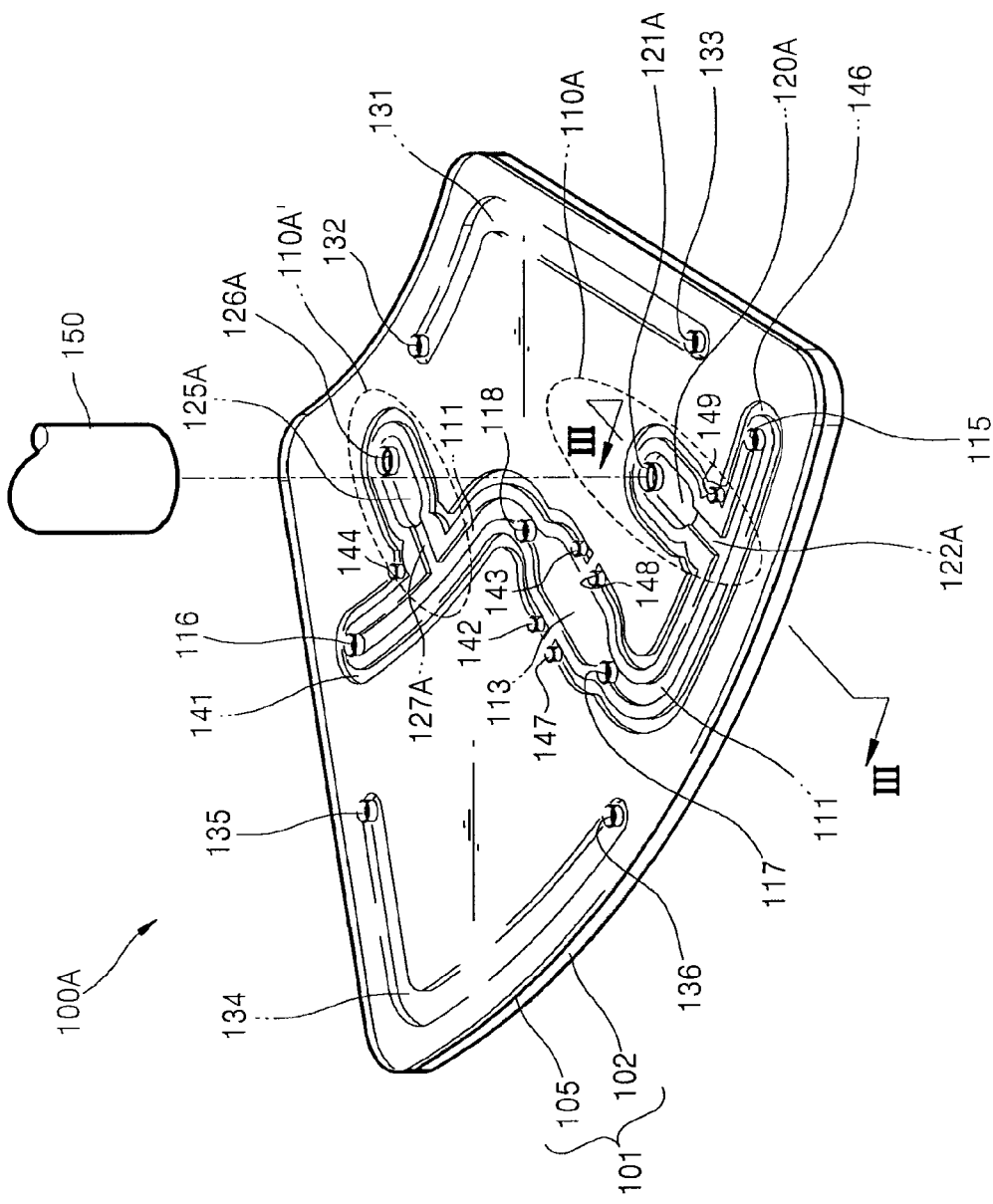
FIG. 3 is a perspective view of a reaction apparatus to which a valve unit according to an embodiment of the present invention is applied.
Figure 4:
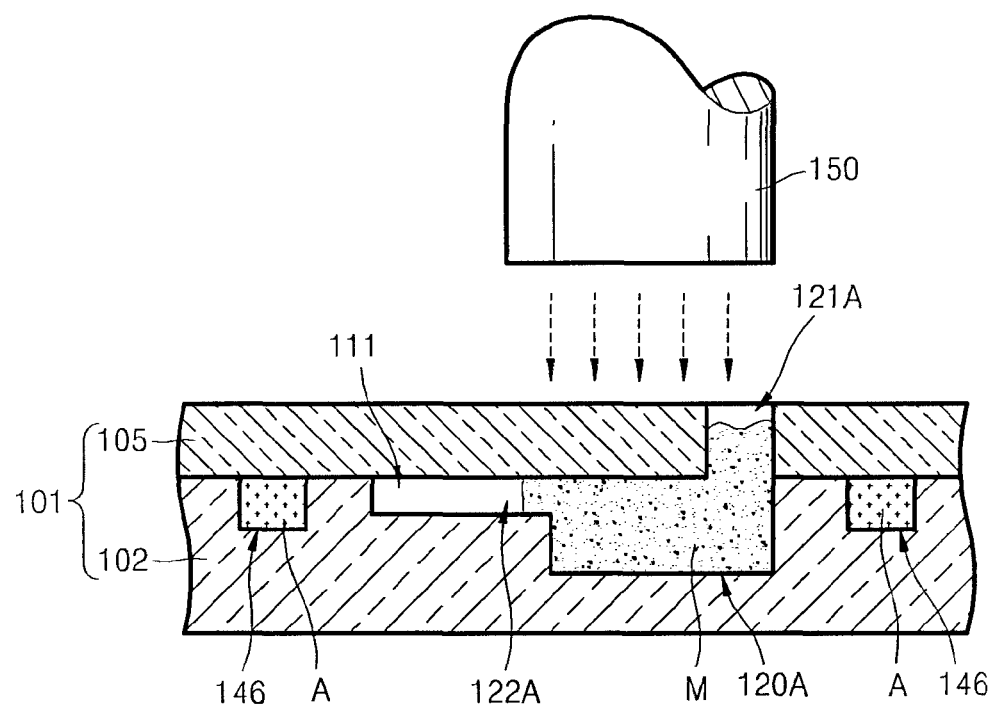
FIG. 4 is a sectional view taken along the line III-III of FIG. 3.

FIG. 3 is a perspective view of a reaction apparatus into which a valve unit according to an embodiment of the present invention is integrated and FIG. 4 is a sectional view taken along the line III-III of FIG. 3.

Referring to FIGS. 3 and 4, a reaction apparatus 100A includes a fluid channel 111 forming a passage for a fluid, for example a biochemical reaction fluid, a substrate 101 which is provided with a reaction chamber 113, and a valve unit 110A for closing the fluid channel 111 on time. The reaction chamber 113 provides a space where the biochemical reaction of the fluid occurs and is observed.

The substrate 101 includes lower and upper plates 102 and 105 bonded together by an adhesive A. The lower plate 102 is provided with the fluid channel 111 and the reaction chamber 113. The upper plate 105 is provided with a plurality of fluid holes 115 and 116 through which the fluid is injected and a plurality of vent holes 117 and 118 for preventing the generation of bubbles in the reaction chamber 113.

Reference number 131 indicates an adhesive channel for forming a passage for the adhesive A. The upper plate 105 is provided with adhesive holes 132 and 133 through which the adhesive A is injected into the adhesive channel 131. When the adhesive A is injected through one of the adhesive holes 132 and 133, the adhesive A is deposited along the adhesive channel 131 while air is exhausted out of the adhesive channel 131 through the other of the adhesive holes 132 and 133. As the adhesive A hardens, the lower and upper plates 102 and 105 bond together. Reference numbers 134, 141 and 146 indicate other adhesive channels formed on the lower plate 102. Reference number 135 and 136 denote adhesive holes for the adhesive channel 134. Reference numbers 142, 143 and 144 denote adhesive holes for the adhesive channel 141. Reference numbers 147, 148 and 149 denote adhesive holes for the adhesive channel 146.

Even though FIGS. 3 and 4 and their description are directed to an exemplary embodiment employing an adhesive A to fabricate the reaction apparatus 100A, the reaction apparatus including the channels and chambers may be produced by fabricating the upper and lower plates and a double sided adhesive layer, which has a pattern (through holes) corresponding to the chamber and channels, discussed herein.

The reaction apparatus shown in FIG. 3 has two valve units 110A and 110A', each situated at opposite ends of the reaction chamber 113. The valve units 110A and 110A' each include valve chambers 120A and 125A, and connection passages 122A and 127A, respectively. It reaction apparatus further includes a laser beam source 150, which is an exemplary external energy source radiating electromagnetic waves toward the valve chambers 120A and 125A. The valve chambers 120A and 125A may be formed in one of the lower and the upper plates. In one exemplary embodiment shown in FIGS. 3 and 4, they are formed on the lower plate 102 of the substrate 101 and filled with a valve filler M. The upper plate 105 is provided with valve filler holes 121A and 126A through which valve filler is injected into the valve chambers 120A and 125A.

The connection passage 122A connects the valve chamber 120A to the fluid channel 111. The connection passage 127A connects the valve chamber 125A to the fluid channel 111. The connection passages 122A and 127A may be formed in one of the lower and the upper plates. In one exemplary embodiment shown in FIGS. 3 and 4, they are formed on the lower plate 102 of the substrate 101. The valve unit 110A closes the fluid channel connected to one side of the reaction chamber 113, and the other valve unit 110A' closes the fluid channel connected to the other side of the reaction chamber 113.

The entire portion or at least a portion, where overlaps the valve chamber 120A of the valve unit 110A and the valve chamber 125A of the valve unit 110A', of the upper plate 105 is transparent so as to allow a laser beam emitted from the laser beam source 150 to be transmitted to the valve chambers 120A and 125A. Therefore, the upper plate 105 may be formed of glass or a transparent plastic material. The lower plate 102 may be formed of a material which is identical to or different from that of the upper plate 105. Meanwhile, when the lower plate 102 is formed of a silicon material, which is highly thermal-conductive, a reaction such as the PCR requiring thermal cycling can be quickly and reliably performed.

The valve filler M may include a phase-transition material that is in a solid state at an operational temperature and a plurality heat generation particles dispersed in the phase-transition material. In one embodiment, the particles are uniformly dispersed in the phase-transition material. The particles may be embedded in the phase-transition material and present on the surface of the phase-transition material when the phase-transition material is in solid phase. The phase-transition material may be wax that is phase-changed into a liquid state, which causes its volume to expand when it is heated. For example, the wax may be paraffin wax, microcrystalline wax, synthetic wax, or natural wax. These waxes have various ranges of a phase-transition temperature. In one embodiment, a paraffin wax of a phase-transition temperature of about 50-52° C. may be used. In one embodiment, the heat may be applied to the valve chamber to a range of temperature of about 20-30° C., to melt and expand the valve filler composition.

The phase-transition material may be a gel or a thermoplastic material. The gel may be formed of polyacrylamide, polyacrylates, polymethacrylates, or polyvinylamides. The thermoplastic material may be formed of cyclic olefin copolymer (COC), polymethylmethacrylate (PMMA), polycarbonate (PC), polystyrene (PS), polyoxymethylene (POM), perfluoralkoxy (PFA), polyvinylchloride(PVC), polypropylene (PP), polyethylene terephthalate (PET), polyetheretherketone (PEEK), polyamide (PA), polysulfone (PSU), or polyvinylidene fluoride (PVDF).

The heat generation particles have an average diameter in the range of 1 nm to 100 μm so that the heat generation particles can freely pass through the connection passages 122A and 127A. When electromagnetic waves, such as a laser beam, are irradiated onto the heat generation particles, the heat generation particles generate heat. The heat generation particles may be beads. The beads may have a multiple layer structure. For example, the beads may have a core containing metal components and an outer hydrophobic layer on the core. In one exemplary embodiment, the metal component of the core is Fe and the outer hydrophobic layer is formed of a surfactant. Surfactants which may be used to form the outer hydrophobic layer, may be selected from one commonly known in the art. For example, a commercially available surfactant, such as those distributed by Ferrotech (Pittsburgh, Pa.), may be used. In one embodiment, the surfactant may include a polyethyleneglycol. The methods of the formation of such magnetic beads are known in the art, for example in U.S. Pat. Nos. 5,039,559 or 6,337,215, which are incorporated by reference herein in their entirety.

The heat generation particles may be stored and dispersed in a carrier oil. The carrier oil may be hydrophobic so that the heat generation particles having the hydrophobic surface layer can be uniformly dispersed therein. The carrier oil in which the heat generation particles are dispersed may be mixed with the wax to form the valve filler M. The carrier oil may be selected from one commonly known in the art. For example, commercially available ferrofluids, such as those distributed by Ferrotech (Pittsburgh, Pa.), may be used. In one embodiment, the carrier oil may include a hydrocarbon oil. The particles may be in the form of a quantum dot or a magnetic bead.

Figure 5:
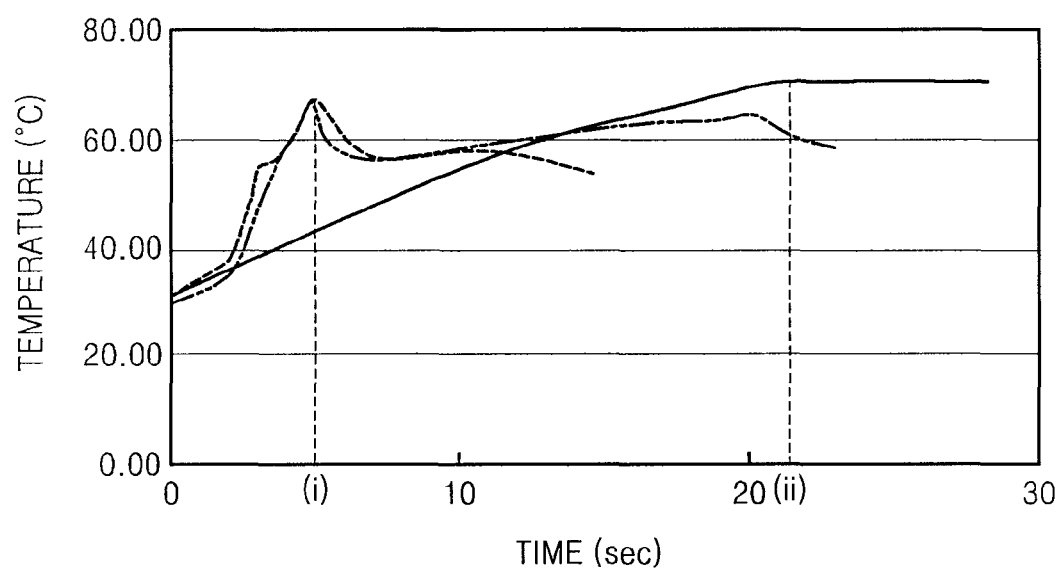
FIG. 5 is a graph illustrating the time taken to reach a melting point when laser is irradiated to pure paraffin wax and paraffin wax including heat generation particles heated by laser irradiation.

FIG. 5 is a graph illustrating the time taken to reach a melting point when laser is irradiated to pure paraffin wax and paraffin wax including heat generation particles heated by laser irradiation.

Referring to FIG. 5, the solid line shows a temperature variation of the pure paraffin wax. The dotted line and double dotted line each show temperature variations of 1:1 v/v and 1:4 v/v mixtures of heat generation particles and paraffin wax. The heat generation particles maybe ferronanoparticles, surface of which optionally treated with functional groups. The heat generation particles have an average diameter of 10 nm and are dispersed in a carrier oil. A laser beam having a wavelength of 808 nm was used for the test. The melting point of the paraffin wax ranges from about 68° C. to 74° C. Referring to FIG. 5, the pure paraffin wax reached the melting point after more than 20 seconds elapsed (see (ii) in FIG. 5). The 1:1 and 1:4 mixtures of paraffin wax were quickly heated to reach the melting point. That is, the 1:1 and 1:4 mixtures of paraffin wax reached the melting point after about 5 seconds of heating (see (i) in FIG. 5).

Referring again to FIGS. 3 and 4, the heat generation particles may include ferromagnetic materials, such as Fe, Ni, Co, or an oxide thereof. Oxides may include, but is not limited to, $Fe_2O_3$ and $Fe_2O_4$. The heat generation particles may include a metal oxide, such as $Al_2O_3$, $TiO_2$, $Ta_2O_3$, $Fe_2O_3$, $Fe_2O_4$, or $HfO_2$, etc. When the heat generation particles include such a ferromagnetic material, it is possible to easily adjust the position of the heat generation particles using a magnet. Therefore, after the valve filler M is injected through the valve filler holes 121A and 126A, it is possible to move the valve filler M to a position where the fluid channel 111 can be more easily closed with the valve filler M using the magnet at an external side of the substrate 101.

The laser beam source 150 may include a laser diode. A laser beam source that can irradiate a pulse laser beam having energy of at least 1 mJ/pulse may be used as the laser beam source 150. Alternatively, a laser beam source that can irradiate a continuous wave laser beam having an output of at least 10 mW may be used as the laser beam source 150. The reaction apparatus 100A may further include another laser beam source (not shown) facing the valve chamber 125A of the valve unit 110A'. Alternatively, the reaction apparatus 100A may further include an optical path converting unit (e.g., one or more mirrors) for diverting an optical path of the laser beam source 150 in a direction toward the second valve chamber 125A.

Figure 6A:
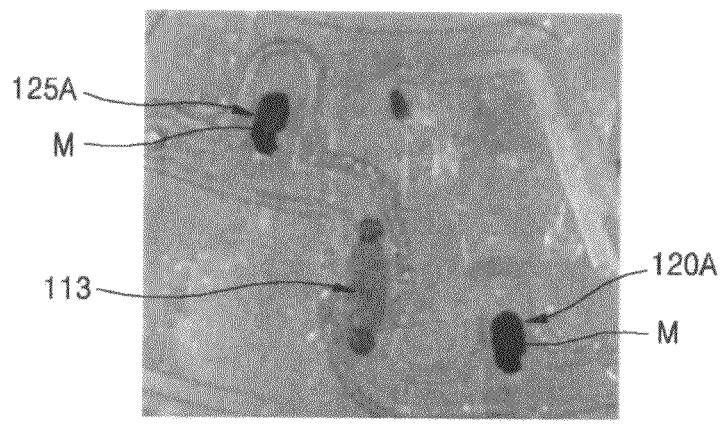
FIGS. 6A, 6B and 6C are pictures sequentially illustrating an operation test result of the valve unit shown in FIGS. 4 and 5.
Figure 6B:
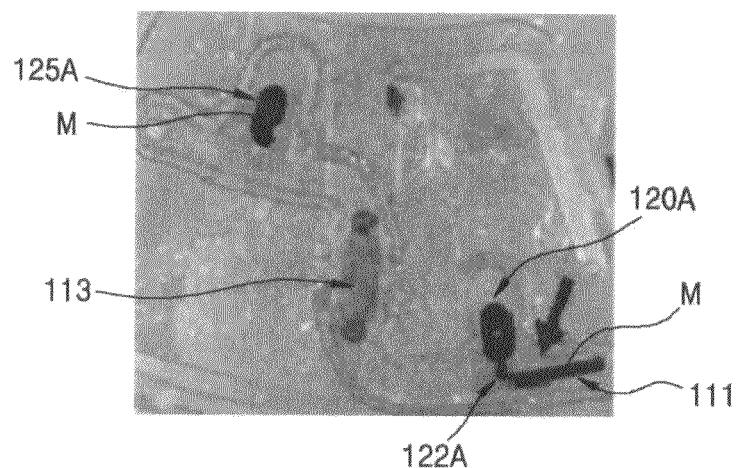
Figure 6C:
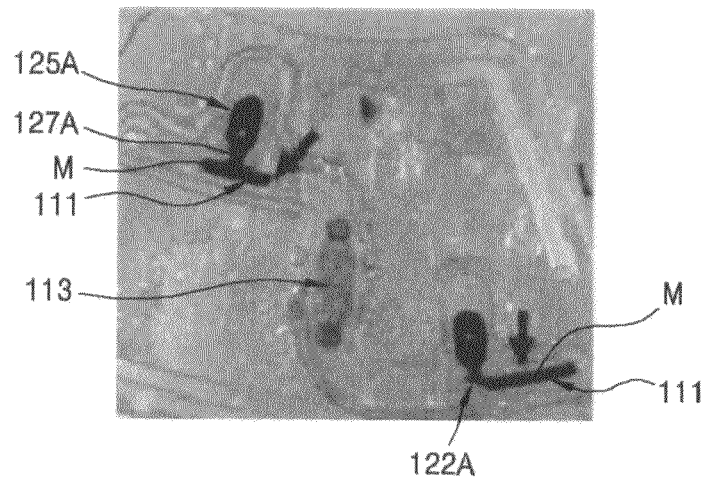

A test was conducted to observe the operation of the valve unit 110A. FIGS. 6A, 6B and 6C consecutively show the test results.

Referring to FIG. 6A, a black valve filler M is filled in the first and second valve chambers 120A and 125A. The black valve filler is 1:1 mixture of paraffin wax, in which a carrier oil containing heat generation particles of a diameter of 10 nm and paraffin wax are mixed in a ratio of 1:1 by volume. Referring to FIG. 6B, when the continuous wave laser beam of 1.5 W is irradiated to the first valve chamber 120A, the valve filler M in the first valve chamber 120A is quickly heated to expand as if it is exploding. Then, the valve filler M is directed into the fluid channel 111 through the first connection passage 122A. The valve filler M directed to the fluid channel 111 is quickly cooled down by stopping the irradiation of the laser beam and is thus solidified so as to close the fluid channel 111 connected to one of the reaction chamber 113.

Referring to FIG. 6C, when the continuous wave laser beam of 1.5 W is irradiated to the second valve chamber 125A, the valve filler M in the second valve chamber 125A is quickly heated to make it expand as if it is exploding. Then, the valve filler M is directed into the fluid channel 111 through the second connection passage 127A. The valve filler M directed to the fluid channel 111 is quickly cooled down by stopping the irradiation of the laser beam and is thus solidified so as to close the fluid channel 111 connected to the other side of the reaction chamber 113. After the fluid channel 111 is closed, the laser beam is irradiated to the green fluid in the reaction chamber 113 for 40 seconds in order to induce a lysis reaction. When examined to see if leakage from the closed fluid channel 111 occurs, leakage did not occur.

Figure 7:
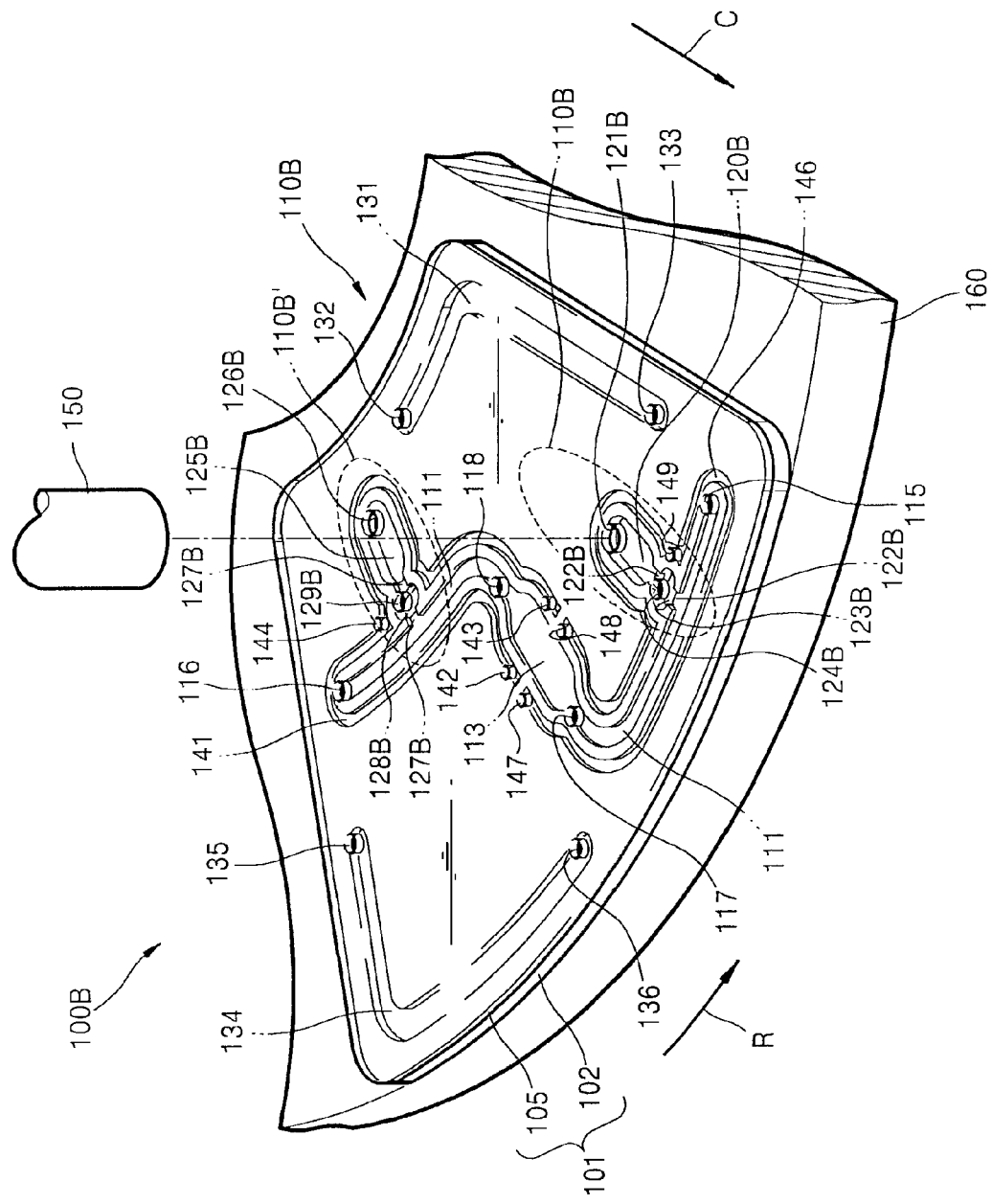
FIG. 7 is a perspective view of a reaction apparatus to which a valve unit according to another exemplary embodiment of the present invention is applied.
Figure 8:
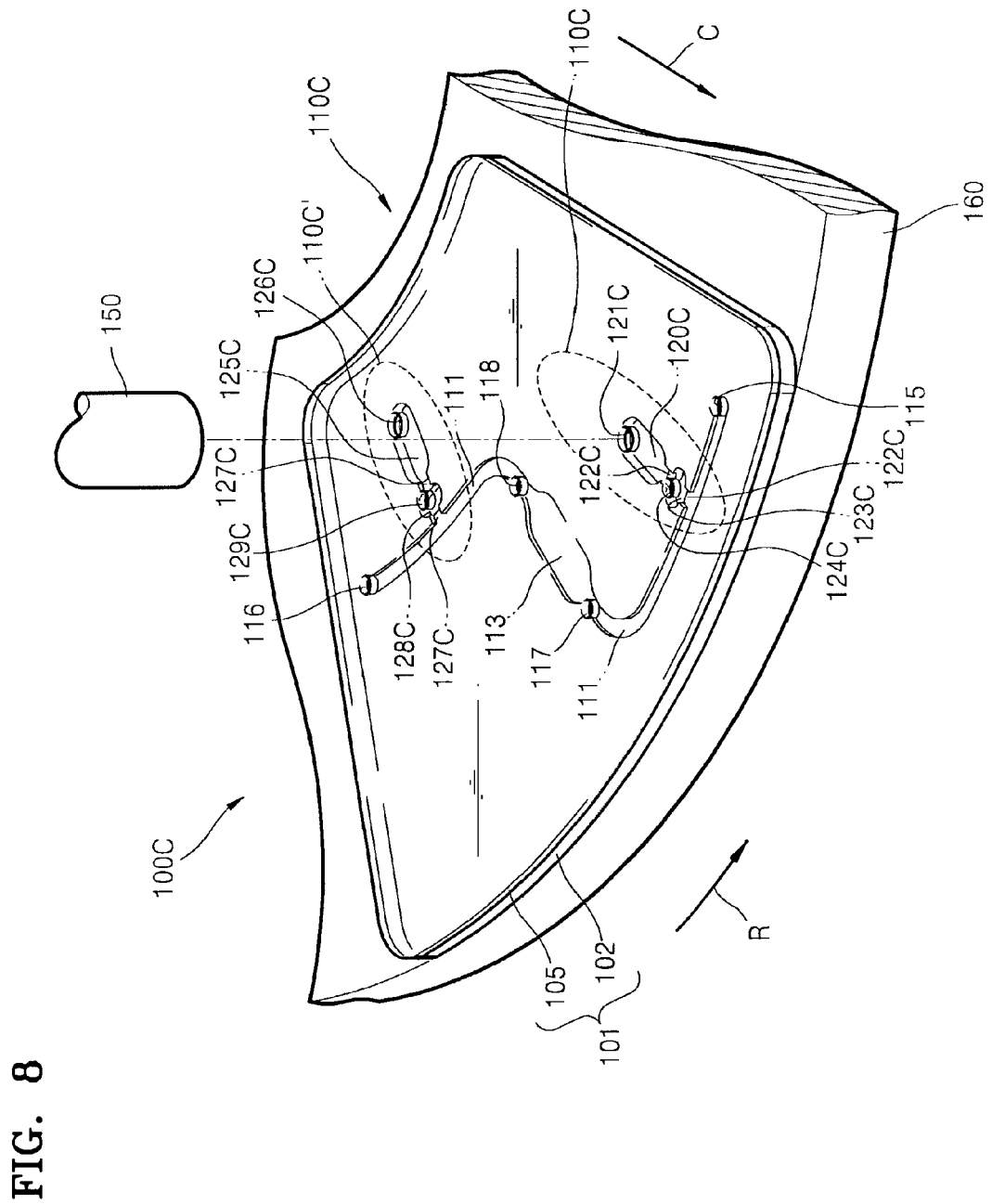
FIG. 8 is a perspective view of a reaction apparatus to which a valve unit according to another exemplary embodiment of the present invention is applied.

FIG. 7 is a perspective view of a reaction apparatus to which a valve unit according to another embodiment of the present invention is applied and FIG. 8 is a perspective view of a reaction apparatus to which a valve unit according to another embodiment of the present invention is applied.

Valve units 110B and 110C and reaction apparatuses 100B and 100C according to embodiments shown in FIGS. 7 and 8 are similar to those of the embodiment shown in FIGS. 3 and 4. Therefore, different parts or portions will be mainly described in the following description.

Referring first to FIG. 7, the reaction apparatus 100B includes a fluid channel 111 forming a flowing passage for a fluid, for example a biochemical reaction fluid a substrate 101 which is provided with a reaction chamber 113 is formed on the fluid channel 111, and a valve unit 110B which closes the fluid channel 111. The substrate 101 includes lower and upper plates 102 and 105 bonded together by adhesive.

The lower plate 102 is provided with the fluid channel 111 and the reaction chamber 113. The upper plate 105 is provided with a plurality of fluid holes 115 and 116 through which the fluid is injected into the fluid channel 111 and a plurality of vent holes 117 and 118 for preventing the generation of bubbles in the reaction chamber 113. Reference numerals 131, 134, 141, 146 indicate adhesive channels formed on the lower plate 102 and reference numerals 132, 133, 135, 136, 142, 144, 147, 148, and 149 denote adhesive holes formed on the upper plate 105.

Referring to FIG. 8, in a reaction apparatus of this embodiment, upper and lower plates 102 and 105 are thermally bonded together by an ultrasonic wave. Therefore, the substrate 101 is not provided with an adhesive channel forming a flowing passage for adhesive or adhesive holes for injecting the adhesive into the adhesive channel.

Referring again to FIG. 7, the reaction apparatus has two valve units 110B and 110B', each situated at opposite ends of the reaction chamber 113. The valve units 110B and 110B' each includes first and second valve chambers 120B and 125B, respectively, first and second connection passages 122B and 127B, respectively, and first and second and buffer chambers 123B and 128B, respectively, and a laser beam source 150. The valve chambers 120B and 125B may be formed in one of the lower and the upper plates. In one exemplary embodiment shown in FIG. 7, they are formed on the lower plate 102 and filled with a valve filler M (see FIG. 4). The upper plate 105 is provided with valve filler holes 121B and 126B through which the valve filler M is injected into the valve chambers 120B and 125B.

The first connection passage 122B connects the first valve chamber 120B to the fluid channel 111. The second connection passage 127B connects the second valve chamber 125B to the fluid channel 111. The first and second connection passages 122B and 127B may be formed in one of the lower and the upper plates. In one exemplary embodiment shown in FIG. 7, they are formed on the lower plate 102 of the substrate 101. The first buffer chamber 123B is formed on the first connection passage 122B between the first valve chamber 120B and the fluid channel 111. The second buffer chamber 128B is formed on the second connection passage 127B between the second valve chamber 125B and the fluid channel 111. The first and second buffer chambers 123B and 128B may be formed in one of the lower and the upper plates. In one exemplary embodiment shown in FIG. 7, they are provided on the lower plate 102. The upper plate 105 is provided with vent holes 124B and 129B at a portion corresponding to the first and second buffer chambers 123B and 128B. The buffer chambers 123B and 128B increase marginal tolerance of an injection amount of the valve filler M and prevent the valve filler M from flowing into the fluid channel 111 due to outer shock. Therefore, the buffer chambers 123B and 128B reduce the errors of the products.

The valve unit 110B closes the fluid channel 111 connected to one side of the reaction chamber 113 while the other valve unit 110B' closes the fluid channel 111 connected to the other side of the reaction chamber 113. Meanwhile, the valve filler M and the laser beam source 150 are identical to those of the embodiment shown in FIGS. 2 and 3 and thus a detailed description thereof will be omitted.

The reaction apparatus 100B further includes a turntable 160 supporting the substrate 101 and rotating at a high RPM in a direction indicated by arrow R. Therefore, the substrate 101 supported and rotated by the turntable 160 receives a centrifugal force in a direction indicated by arrow C. The valve filler M filled in the valve chambers 120B and 125B is pumped by the centrifugal force. Even though the turntable 160 is explained with respect to the rotation of the substrate 101, any other proper means, which are known in the art and can be selected by one skilled in the art, may be used for providing support and rotating the substrate at a desired RPM.

Referring again to FIG. 8, the valve unit 110C includes first and second valve chambers 120C and 125C, first and second connection passages 122C and 127C, first and second buffer chambers 123C and 128C, and a laser beam source 150. The reference numbers 121B and 126B denote valve filler holes through which the valve filler M is injected into the valve chambers 120B and 125B. The reference numbers 124C and 129C indicate vent holes for exhausting air.

The valve unit 110C, which includes the first valve chamber 120C, the first buffer chamber 123C and first connection passage 122C, is provided in order to close the fluid channel 111 connected to one side of the reaction chamber 113 while the valve unit 110C', which includes the second valve chamber 125C, the second buffer chamber 128C and the second connection passage 127C, is provided in order to close the fluid channel 111 connected to the other side of the reaction chamber 113. The reaction apparatus 100C includes a turntable 160 supporting and rotating the substrate 101 at a high RPM in a direction indicated by arrow R.

A test was conducted to check the operation of the valve unit 110B. FIGS. 9A, 9B, 9C, and 9D consecutively show the test results.

Figure 9A:
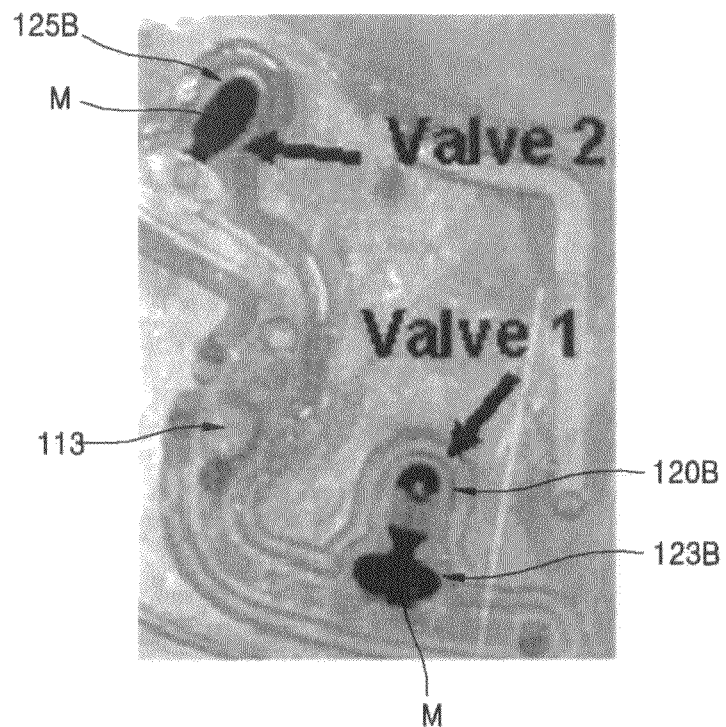
FIGS. 9A, 9B, 9C, and 9D are photographs sequentially illustrating an operation test result of the valve unit shown in FIG. 7.
Figure 9B:
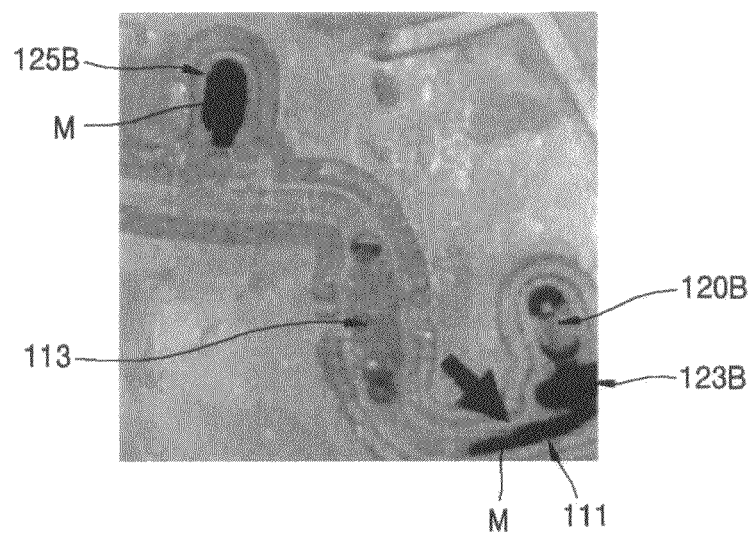
Figure 9C:
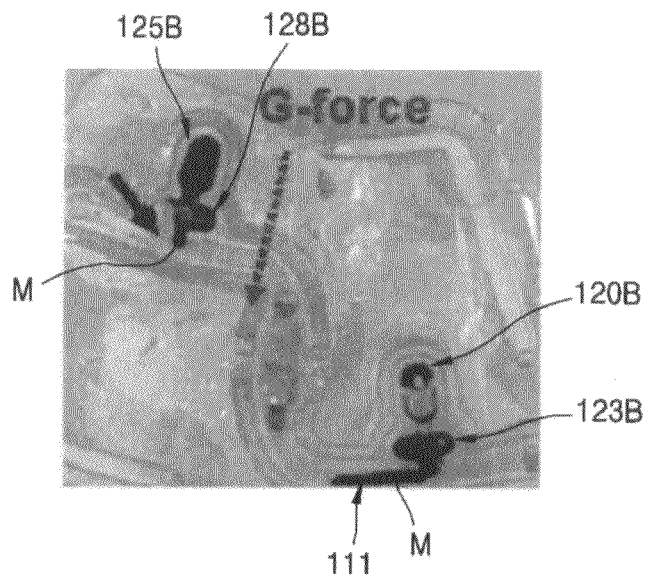
Figure 9D:
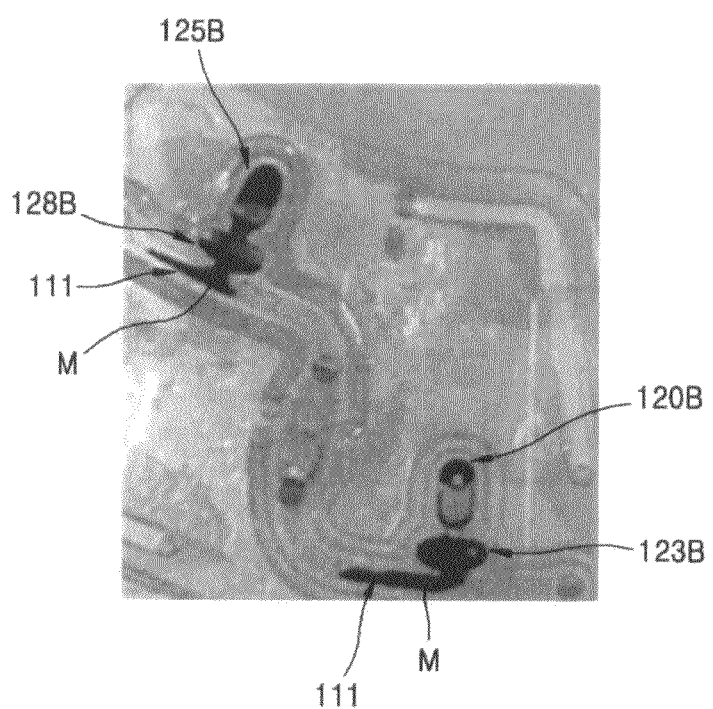

Referring to FIG. 9A, a black valve filler M is filled in the first and second valve chambers 120B and 125B. The black valve filler is a 1:1 v/v mixture of heat generation particles and paraffin wax. The heat generation particles have an average diameter of 10 nm. When the continuous wave laser beam of 1.5 W is irradiated to the first valve chamber 120B for one second and the substrate 101 (see FIG. 7) is rotated at 3000 rpm for several seconds, the valve filler M of the first valve chamber 120B is melted to expand and is pumped by the centrifugal force applied to the substrate 101. Then, the valve filler M is directed into the fluid channel 111 through the first buffer chamber 123B as shown in FIGS. 9A and 9B. The valve filler M directed to the fluid channel 111 is quickly cooled down by stopping the irradiation of the laser beam and is thus solidified so as to close the fluid channel 111 connected to one side of the reaction chamber 113.

When the continuous wave laser beam of 1.5 W is irradiated to the second valve chamber 125B for one second and the substrate 101 (see FIG. 7) is rotated at 3000 rpm for several seconds, the valve filler M of the second valve chamber 125B is melted to expand, and is pumped by the centrifugal force applied to the substrate 101. Then, the valve filler M is directed into the fluid channel 111 through the second buffer chamber 128B (see FIGS. 9C and 9D). The valve filler M directed to the fluid channel 111 is quickly cooled down by stopping the irradiation of the laser beam and is thus solidified so as to close the fluid channel 111 connected to the other side of the reaction chamber 113. After the fluid channel 111 is closed, it is determined whether leakage from the closed fluid channel 111 occurs as the substrate 101 is rotated at 3000 rpm. As a result, it was confirmed that leakage did not occur.

Figure 10:
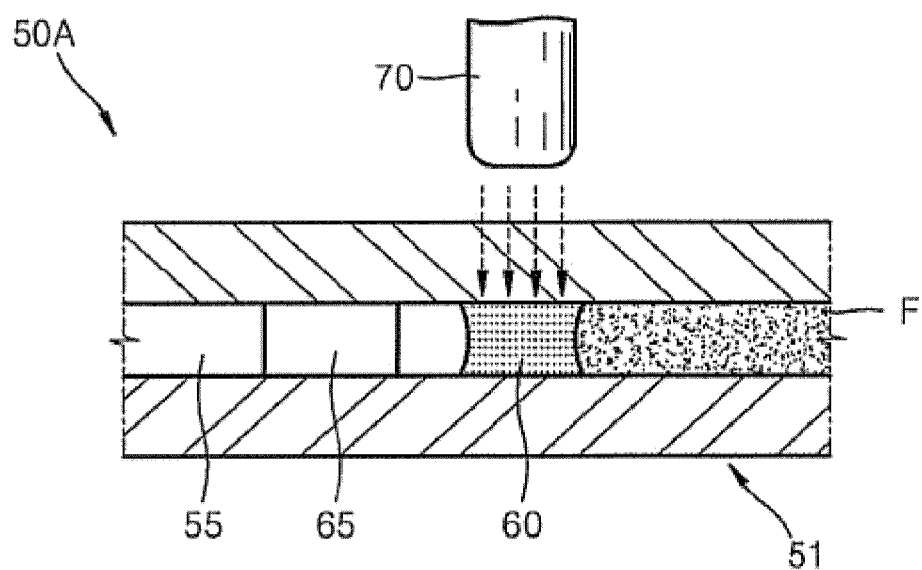
FIG. 10 is a cross-sectional view of an exemplary embodiment of a valve unit according to the present invention.
Figure 11:
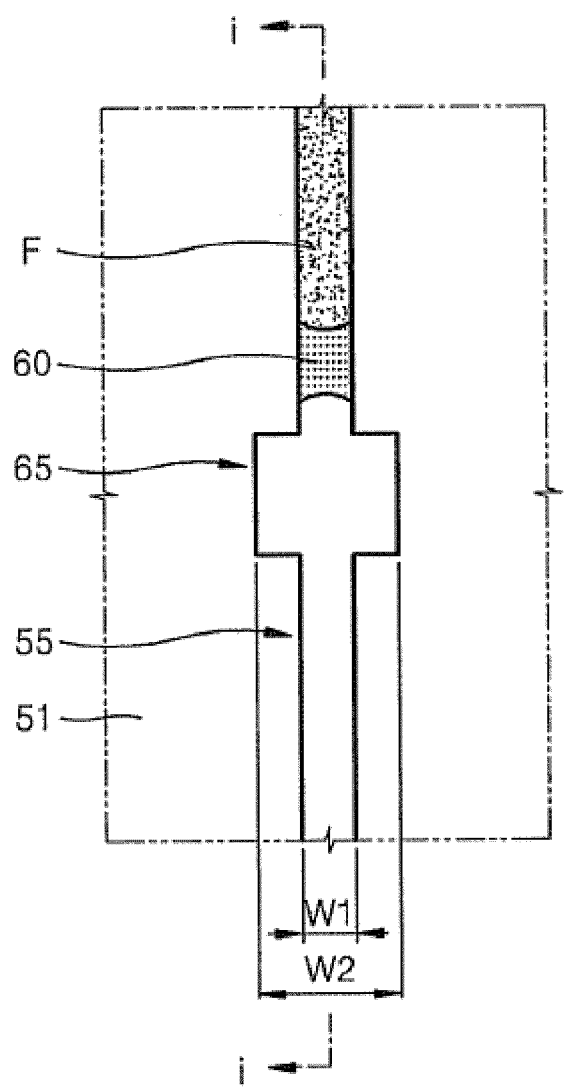
FIG. 11 is a plan view of a substrate of the valve unit illustrated in FIG. 2 when a channel is closed.
Figure 12:
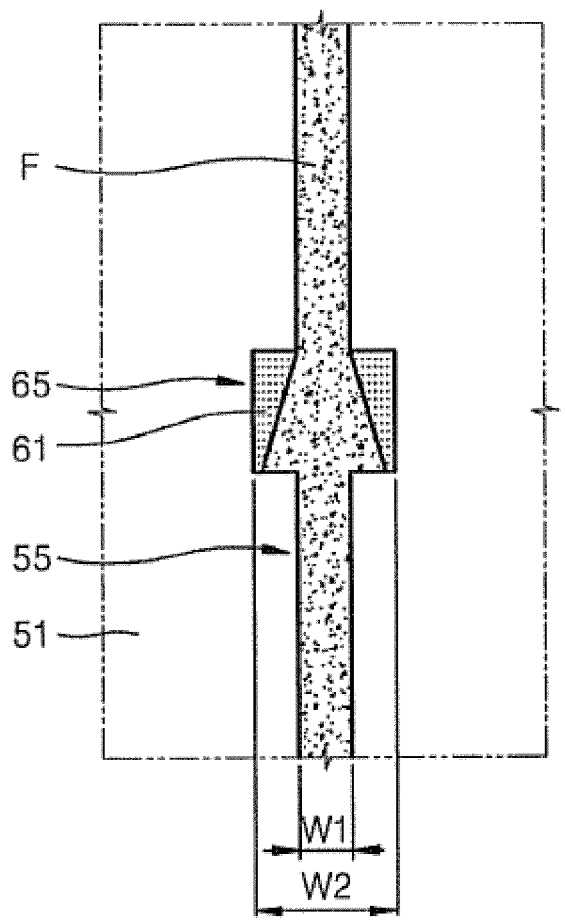
FIG. 12 is a plan view of a substrate of the valve unit illustrated in FIG. 2 when the channel is opened.

FIG. 10 is a cross-sectional view of an exemplary embodiment of a valve unit 50A according to the present invention. FIG. 11 is a plan view of a substrate of the valve unit 50A illustrated in FIG. 10 when a channel is closed, and FIG. 12 is a plan view of a substrate of the valve unit 50A illustrated in FIG. 10 when the channel is opened. Further, FIG. 10 is a cross-sectional view of the valve unit 50A taken along line i-i of FIG. 11.

Figure 15:
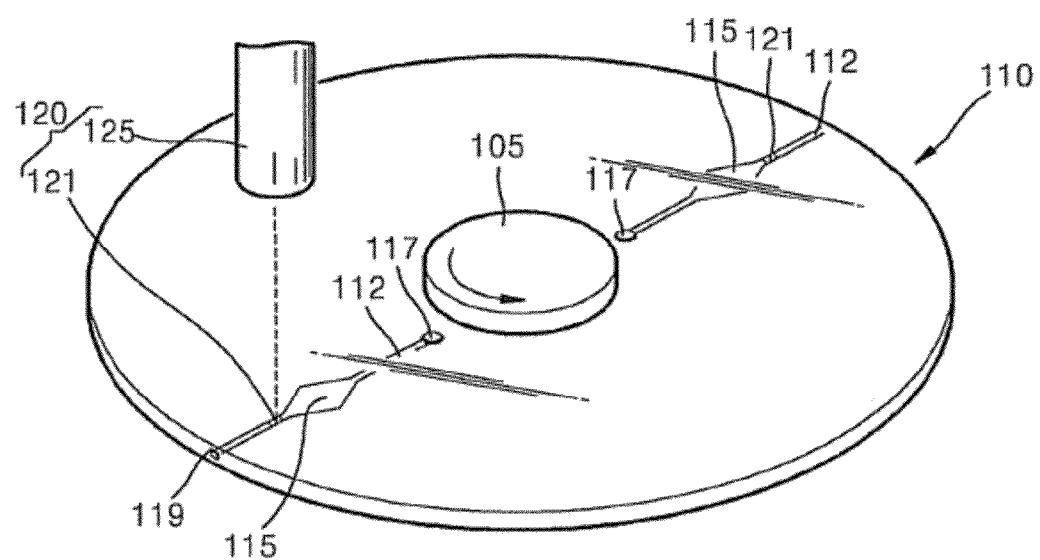
FIG. 15 is a perspective view of an apparatus having an exemplary embodiment of a valve unit according to the present invention.

Referring to FIGS. 2 through 4, the valve unit 50A includes a plug 60 which blocks a path defined by a channel 55, and a laser light source 70, which irradiates a laser beam on the plug 60, as an example of an external energy source for irradiating a laser on the plug 60. The channel 55 is formed in a base substrate 51. The base substrate 51 may be a substrate 110 of an apparatus 100, as illustrated in FIG. 15, for example. The base substrate 51 is formed of a laser-transmitting material, such as transparent glass, so that a laser irradiated from the laser light source 70 disposed outside the base substrate 51 can be incident on the plug 60. Alternatively, transparent plastic material may be used such that a laser beam can transmit through the transparent plastic material, which has a lower cost than glass.

The plug 60 includes a phase change material in a solid state at room temperature and a plurality of fine dissipating particles uniformly dispersed in the phase change material. The plug 60 blocks a flow of the fluid (F) by blocking the channel by being press fit against the inner walls of a predetermined portion of the channel 55. The phase change material may be wax. If the wax is heated, it is molten and is changed into a liquid state. As such, the plug 60 is destroyed and the path is opened allowing flow of the fluid (F). The wax of the plug 60 may have a predetermined melting point. If the melting point is too high, it takes a long time from initiating laser radiation to melting of the wax. Thus, it is difficult to precisely control a time for opening the channel 55. On the other hand, if the melting point is too low, the wax is partially molten in the state where a laser has not been irradiated on the fine heat-dissipating particles so that the fluid (F) may also leak. The wax may be paraffin wax, microcrystalline wax, synthetic wax or natural wax.

The phase change material may be a gel or thermo-plastic resin. The gel may be a polyacrylamide, polyacrylate, polymethacrylate or polyvinylamide. In addition, the thermoplastic resin may be a cycloolefin copolymer ("COC"), polymethylmethacrylate (acrylic) ("PMMA"), polycarbonate ("PC"), polystyrene ("PS"), polyoxymethylene (acetal) ("POM"), perfluoroalkoxy ("PFA"), polyvinyl alcohol (or polyvinyl acetate) ("PVC"), polypropylene ("PP"), polyethylene terephthalate ("PET"), polyetheretherketone ("PEEK"), polyamide (nylon) ("PA"), polysulfone ("PSU") or polyvinylidene fluoride ("PVDF").

The fine heat-dissipating particles have a diameter of about 1 nm to about 100 nm so that they can freely move within the channel 55 having a width of several thousands of micrometers (μm). If an electromagnetic wave such as a laser is irradiated on the fine heat-dissipating particles, due to its radiant energy, the temperature of the fine heat-dissipating particles rapidly rises so that the fine heat-dissipating particles that are uniformly dispersed in the wax dissipate heat. The fine heat-dissipating particles have a core including a metallic component and a hydrophobic surface structure. For example, the fine heat-dissipating particles may have a molecular structure including a core formed of Fe, and a plurality of surfactants, which are combined with iron (Fe) and surround Fe. In general, the fine heat-dissipating particles are dispersed in a carrier oil and are kept therein. The carrier oil may also be hydrophobic so that the fine heat-dissipating particles having a hydrophobic surface structure can be uniformly dispersed. The carrier oil in which the fine heat-dissipating particles are dispersed is poured into the wax and is mixed therewith so that a material used in forming the plug 60 can be manufactured. A shape of the fine heat-dissipating particles is not limited to a polymer illustrated in the above example but may be a quantum dot or a magnetic bead.

Figure 13:
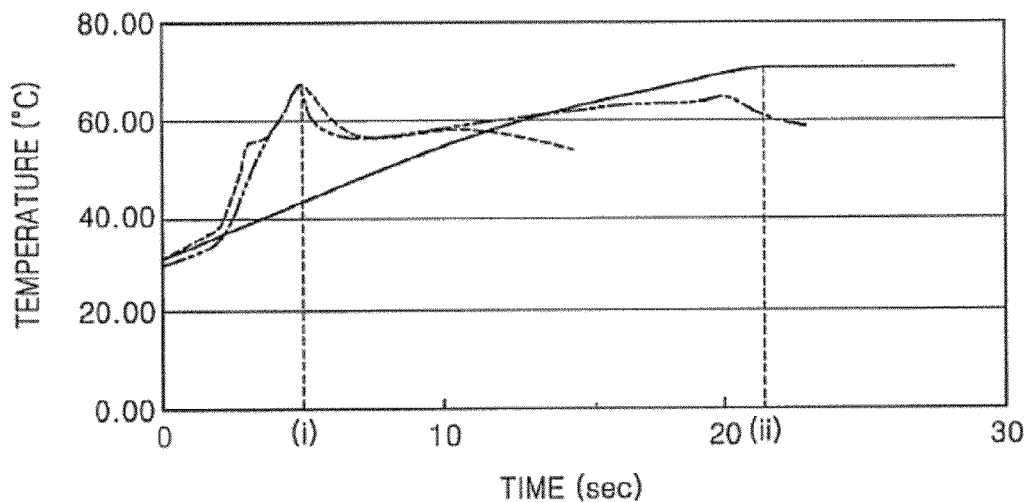
FIG. 13 is a graph of melting point (temperature) versus time in a case where a laser beam is irradiated on a pure paraffin wax and a paraffin wax including fine heat-dissipating particles for dissipating heat by laser radiation.

FIG. 13 is a graph of melting point (temperature) versus time in a case where a laser is irradiated on a pure paraffin wax and a paraffin wax including fine heat-dissipating particles for dissipating heat by laser radiation.

A graph indicated by a solid line in FIG. 13 is a temperature graph of pure (100%) paraffin wax, and a graph indicated by a dotted line in FIG. 13 is a temperature graph of 50% impurity (fine heat-dissipating particles) paraffin wax in which a carrier oil including fine heat-dissipating particles having an average diameter of 10 nm dispersed therein and the paraffin wax are mixed at a ratio of 1:1. A graph indicated by a chain thick line in FIG. 13 is a temperature graph of 20% impurity (fine heat-dissipating particles) paraffin wax in which the carrier oil including fine heat-dissipating particles having an average diameter of 10 nm dispersed therein and the paraffin wax are mixed at a ratio of 1:4. A laser beam having a wavelength of 808 nm was used in this experiment. A melting point of the paraffin wax was about 68-74° C. Referring to FIG. 13, the pure paraffin wax reached a melting point more than 20 seconds after laser irradiation (see (ii)). On the other hand, the 50% impurity (fine heat-dissipating particles) paraffin wax and the 20% impurity (fine heat-dissipating particles) paraffin wax were rapidly heated after laser radiation and reached the melting point about 5 seconds after laser irradiation (see (i)).

The fine heat-dissipating particles may include a ferromagnetic material such as iron (Fe), nickel (Ni), cobalt (Co) or an oxide thereof. In addition, the fine heat-dissipating particles may include a metallic oxide such as Al2O3, TiO2, Ta2O3, Fe2O3, Fe3O4, or HfO2. The position of the fine heat-dissipating particles including the ferromagnetic material can be easily adjusted using a magnet. Thus, if a plug material in which wax and fine heat-dissipating particles are mixed is inserted into the channel 55 and then the magnet is moved along the channel 55 while being close to the plug material outside the base substrate 51, the plug material including wax is pulled toward the magnet and is moved along the channel 55. The plug 60 can be located at a predetermined position of the channel 55 using this characteristic.

The laser light source 70 may include a laser diode. A laser light source for irradiating a pulse laser having an energy of at least 1 mJ/pulse and a laser light source for irradiating a continuous wave laser having an output of at least 10 mW may be used as the laser light source 70 of the valve unit 50A. In the experiment illustrated in FIG. 13, the laser light source 70 irradiated a laser beam having a wavelength of 808 nm. However, the present invention is not limited to this wavelength and a laser light source for irradiating a laser beam having a wavelength of about 750 nm to about 1300 nm may be used as the laser light source 70 of the valve unit 50A.

The valve unit 50A further includes a phase change material chamber 65 in which the molten wax and fine heat-dissipating particles mixed therewith are accommodated when the wax is molten by laser radiation and the channel 55 is opened. The phase change material chamber 65 is formed along the channel 55 to be adjacent to the plug 60 and extends to be a stepped shape on an inner side surface of the channel 55. Thus, the phase change material chamber 65 has a width W2, which is more extended than a width W1 of the channel 55.

As illustrated in FIG. 10, if a laser is irradiated by the laser light source 70 on the plug 60, fine heat-dissipating particles dispersed in the wax dissipate heat due to a rapid rise in temperature caused by an energy of the laser, and the wax is rapidly heated by this heat dissipation and is rapidly molten. Thus, the plug 60 is destroyed and the non-circulating fluid (F) flows along the channel 55. The wax and the fine heat-dissipating particles dispersed therein are accommodated in the phase change material chamber 65 and are solidified again. Reference numeral 61 in FIG. 12 denotes the wax and the fine heat-dissipating particles, which are solidified again in the above manner in the phase change material chamber 65.

Figure 14:
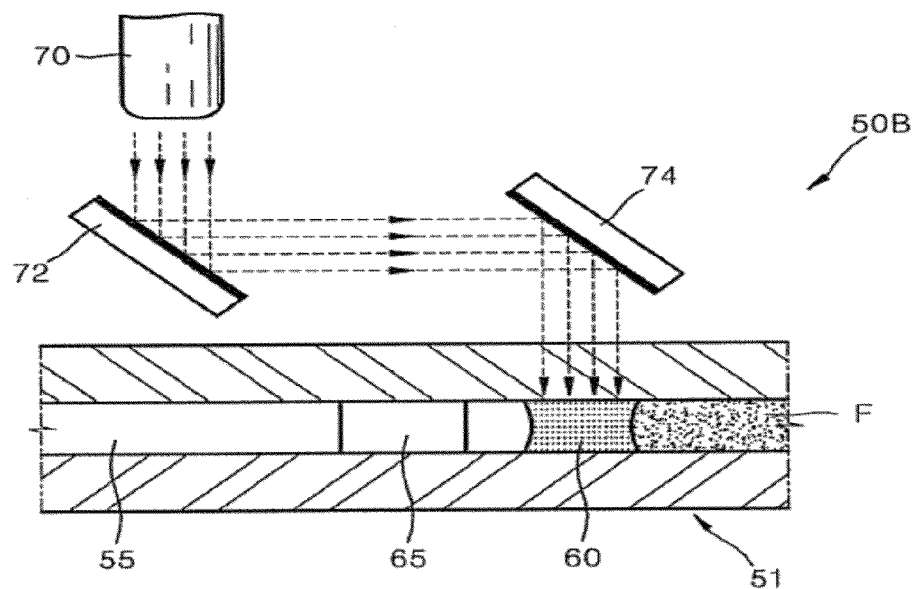
FIG. 14 is a cross-sectional view of another exemplary embodiment of a valve unit according to the present invention.

FIG. 14 is a cross-sectional view of another exemplary embodiment of a valve unit 50B according to the present invention. Referring to FIG. 14, like the valve unit 50A illustrated in FIGS. 2 through 4, the valve unit 50B includes a plug 60 which blocks a flow path formed by a channel 55, a laser light source 70 which irradiates a laser beam on the plug 60, and a phase change material chamber 65 in which wax and fine heat-dissipating particles dispersed therein are accommodated when the flow path is opened. The laser light source 70 of the valve unit 50B does not irradiate a laser beam directly toward the plug 60. The valve unit 50B further includes a light-path changing unit which changes a path of the laser beam so that the laser irradiated by the laser light source 70 can be directed toward the plug 60. The light-path changing unit includes a pair of mirrors 72 and 74. The laser beam irradiated by the laser light source 70 is sequentially reflected from the first mirror 72 and the second mirror 74, is transmitted through a base substrate 51 and is incident on the plug 60.

The number of laser light sources 70 and the number of plugs 60 may not correspond to each other. For example, when a plurality of channels 55 are formed in the base substrate 51, a plurality of plugs 60 may be provided. Even if only one channel 55 is formed in the base substrate 51, a plurality of plugs 60 may be provided to the one channel 55. In this case, if a predetermined light-path changing unit is provided, one laser light source 70 or a plurality of laser light sources 70 less than the number of the plugs 60 may irradiate a laser on the plurality of plugs 60.

FIG. 15 is a perspective view of an exemplary embodiment of an apparatus 100 having a valve unit according to the present invention. Referring to FIG. 15, the apparatus 100 includes a disc-shaped substrate 110, a spindle motor 105 for rotating the substrate 110 and a laser light source 125 for irradiating a laser beam on the substrate 110. The substrate 110 corresponds to the base substrate 51 illustrated in FIGS. 2 through 4. The substrate 110 includes a plurality of channels 112 (two shown) for forming a path of a fluid and a reaction chamber 115 disposed along a portion of each channel 112. A reaction of the fluid is performed in the reaction chamber 115. Each channel 112 extends in a radial direction of the substrate 110, an inlet 117 for the fluid is disposed at one end of each channel 112 proximate to a center of the substrate 110, and an outlet 119 for the fluid is disposed at the other end of each channel 112 proximate to a circumferential portion of the substrate 110. The fluid flowing into the channel 112 through the inlet 117 is pumped in the circumferential direction of the substrate 110, that is, in a direction toward the outlet 119, by a centrifugal force generated by rotation of the substrate 110. A pair of channels 112 are shown in FIG. 15. However, this is just one example and three or more channels or only one channel may be provided in alternative exemplary embodiments.

A plug 121 for blocking a flow of the fluid is disposed in each channel 112 in a position of the substrate 110 on which a laser irradiated by a laser light source 125 is incident. The plug 121 corresponds to the plug 60 illustrated in FIGS. 2 through 4. The plug 121 and the laser light source 125 constitute a valve unit 120 of the present invention. The valve unit 120 corresponds to the valve unit 50A illustrated in FIGS. 2 through 4, and thus, a detailed description of the plug 121 and the laser light source 125 of the valve unit 50A will be omitted.

Although not shown, a phase change material chamber (65, see FIGS. 2 through 4) in which the molten wax and the fine heat-dissipating particles mixed therein are accommodated may be further provided to the channel 112. In addition, a light-path changing unit including mirrors 72 and 74 (see FIG. 14), for example, may be further provided so that a laser beam can be irradiated by one laser light source 125 on a plurality of plugs 121 disposed on the substrate 110.

A valve unit for closing a path by melting, and thereby expanding, a plug made of a phase changing material (with or without fine heat-dissipating particles) and an apparatus using the same are also included in the present invention. In such a device the plug may be made to expand into a channel and thereby block the flow of fluid through that channel. One skilled in the art would realize that the plug may have various other uses to open, close, or partially obstruct a channel, all of which are within the scope of the present invention.

Meanwhile, a valve unit for opening a path by melting a plug by irradiating an electromagnetic wave on the plug formed of only a phase change material (not including fine heat-dissipating particles), and an apparatus having the same are also included in the present invention.

As described above, in the valve unit according to exemplary embodiments of the present invention, compared to the conventional valve unit having a plug including wax only, a response speed for opening the channel is faster such that a time for opening the channel can be precisely controlled. In addition, in the apparatus having the valve unit according to exemplary embodiments of the present invention, a unit for heating wax is not included in the substrate allowing the substrate to be made smaller.

In addition, in the valve unit according to exemplary embodiments of the present invention, a number of laser light sources being less than the number of plugs are provided with respect to a plurality of plugs such that costs for manufacturing the valve unit and the apparatus having the same can be reduced.

The present invention also provides a valve unit that can close a channel as a result of melting a valve filter including only a phase-transition material, not heat generation particles, by electromagnetic wave irradiation, and a reaction apparatus using the valve unit.

According to the present invention, no air pump or heating plate is provided, it is easy to reduce the size of the biochemical reaction substrate, and integration of the substrate is achieved.

In addition, since the closing of the channel is realized by the irradiation of electromagnetic waves, such as a laser beam, the channel can be quickly and timely closed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A valve unit comprising:
a substrate;
a channel formed in the substrate defining a path through which a fluid flows;
a plug formed in the channel to block the path of the fluid in the channel when the plug is in a solid state at a room temperature, the plug including a phase change material and a plurality of heat-dissipating particles dispersed in the phase change material;
a phase change material chamber formed along the channel adjacent to the plug; and
an external energy source which irradiates the plug with electromagnetic energy,
wherein, when the plug is irradiated with the electromagnetic energy, the plurality of fine heat-dissipating particles dissipate heat and the phase change material become molten, and flows to the phase change material chamber thereby opening the path to allow the fluid to flow, and wherein the heat-dissipating particles are dispersed in a hydrophobic carrier oil.

2. A valve unit comprising:
a valve filler which includes a phase transition material and a plurality of heat generation particles;
a chamber to receive the valve filler;
a fluid channel which is connected to the chamber; and
an external energy source which comprises a laser beam source irradiating a laser beam, wherein the valve unit is provided on a rotatable substrate, the heat generation particles are dispersed in the phase transition material and generate heat upon an application of electromagnetic wave energy of the laser beam from the laser beam source, wherein the phase transition material melts and expands upon an application of heat which is generated by the heat generation materials, and the valve filler is directed from the chamber into the channel to close the channel by centrifugal force caused by rotation of the substrate, and the heat generation particles are dispersed in a hydrophobic carrier oil.

3. The valve unit of claim 2, wherein the laser beam source includes a laser diode.

4. The valve unit of claim 2, wherein the laser beam emitted from the laser beam source is a pulse electromagnetic wave having an energy of at least 1 mJ/pulse.

5. The valve unit of claim 2, wherein the laser beam emitted from the laser beam source is a continuous wave electromagnetic wave having an output of at least 10 mW.

6. The valve unit of claim 2, wherein the laser beam emitted from the laser beam source has a wavelength in the range of 750 to 1300 nm.

7. The valve unit of claim 2, wherein the heat generation particles have an average diameter in the range of 1 nm to 100 µm.

8. The valve unit of claim 2, wherein the heat generation particles are in the form of a quantum dot or a magnetic bead.

9. The valve unit of claim 2, wherein the heat generation particles include a ferromagnetic material or a metal oxide.

10. The valve unit of claim 9, wherein the metal oxide is at least one selected from the group consisting of $Al_2O_3$, $TiO_2$, $Ta_2O_3$, $Fe_2O_3$, $Fe_2O_4$, and $HfO_2$.

11. The valve unit of claim 2, wherein the heat generation particles are formed of a polymer.

12. The valve unit of claim 11, wherein the heat generation particles are magnetic beads and the magnetic beads are formed of a magnetic material selected from the group consisting of Fe, Ni, Cr, and an oxide thereof.

13. The valve unit of claim 12, wherein the magnetic beads has a core formed from the magnetic material and further comprises an outer hydrophobic layer formed on the magnetic material core.

14. The valve unit of claim 2, wherein the phase-transition material is at least one selected from the group consisting of wax, a gel, and a thermoplastic resin.

15. The valve unit of claim 14, wherein the wax is at least one selected from the group consisting of paraffin wax, microcrystalline wax, synthetic wax, and natural wax.

16. The valve unit of claim 14, wherein the gel is formed of at least one material selected from the group consisting of polyacrylamide, polyacrylates, polymethacrylates, and polyvinylamides.

17. The valve unit of claim 14, wherein the thermoplastic resin is at least one selected from the group consisting of a cyclic olefin copolymer, a polymethylmethacrylate, a polycarbonate, a polystyrene, a polyoxymethylene, a perfluoralkoxy, a polyvinylchloride, a polypropylene, a polyethylene terephthalate, a polyetheretherketone, a polyamide, a polysulfone, and a polyvinylidene fluoride.

* * * * *